Jan. 30, 1968     R. M. DOWNEY     3,366,325
RETRACTABLE SLIDE RULE
Filed May 16, 1966     2 Sheets-Sheet 1
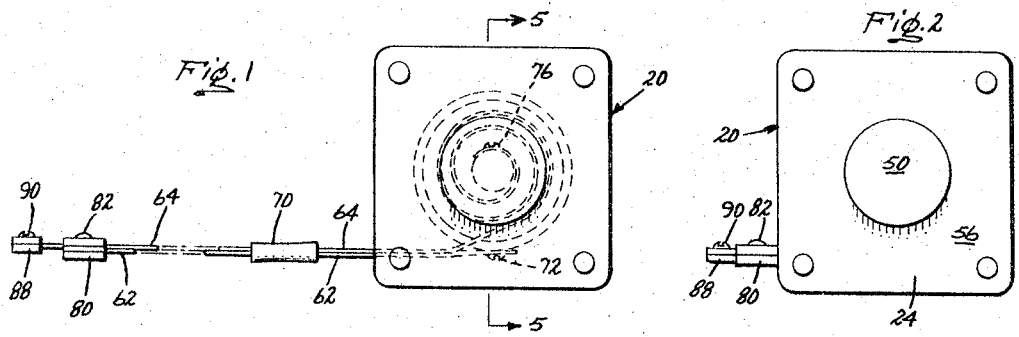
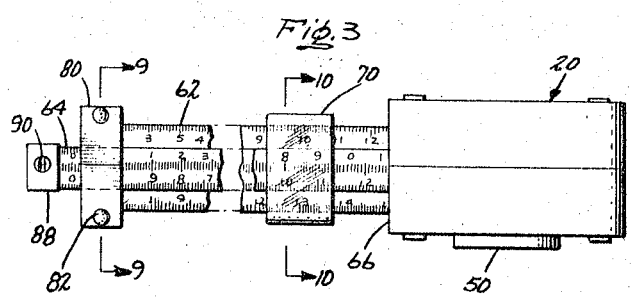
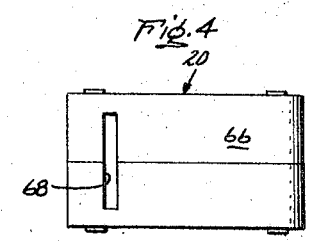
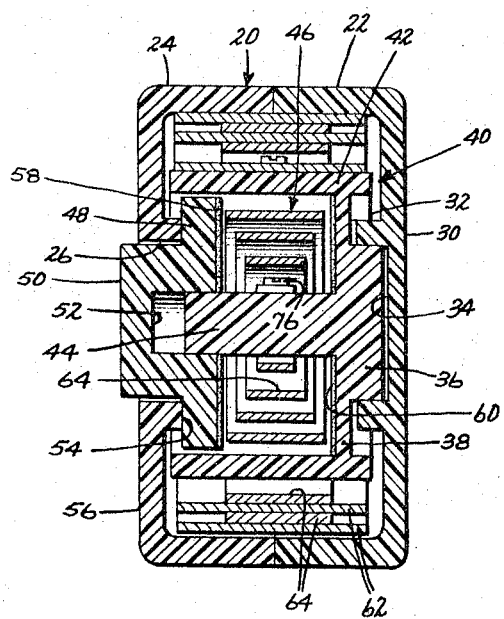
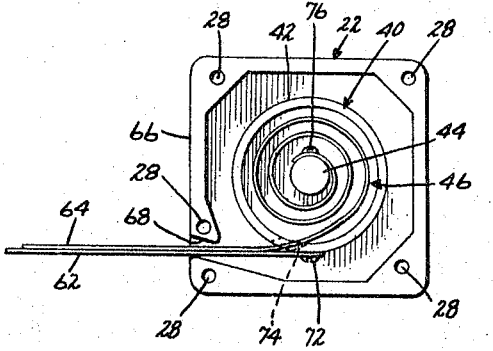
INVENTOR.
Richard M. Downey,
BY Hood, Just & Irish
Attorneys.

Jan. 30, 1968     R. M. DOWNEY     3,366,325
RETRACTABLE SLIDE RULE
Filed May 16, 1966     2 Sheets-Sheet 2
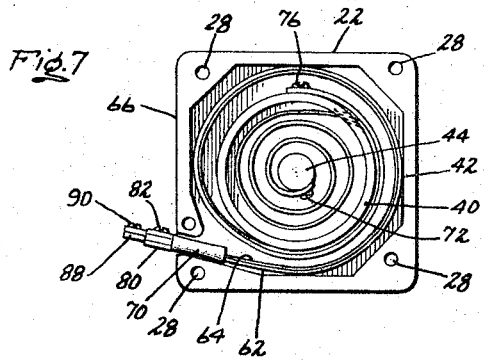
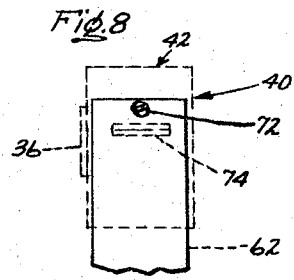
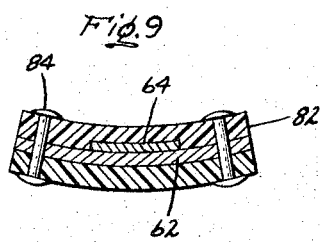
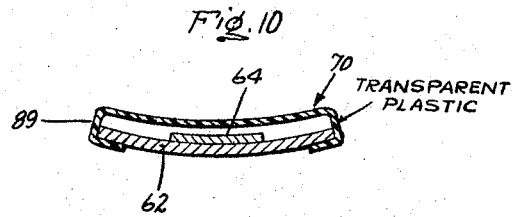
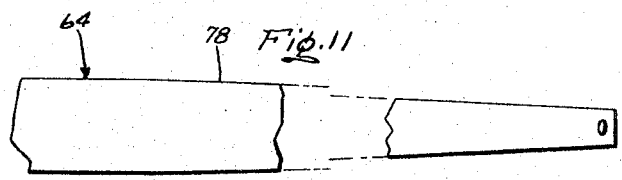
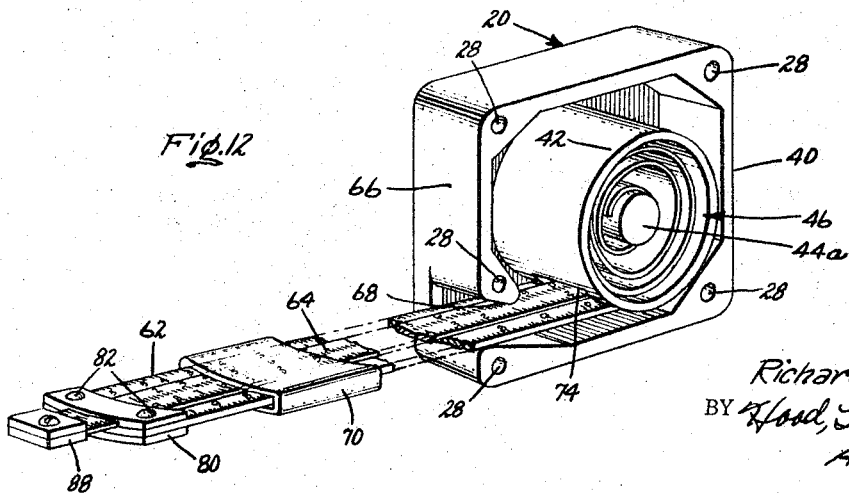
INVENTOR.
Richard M. Downey,
BY Hood, Gust & Irish
Attorneys.

United States Patent Office 3,366,325
Patented Jan. 30, 1968

3,366,325
RETRACTABLE SLIDE RULE
Richard M. Downey, R.R. 1, Roann, Ind. 46974
Filed May 16, 1966, Ser. No. 550,428
17 Claims. (Cl. 235—71)

The present invention relates to a retractable slide rule, and more particularly to a slide rule of full size and conventional operability which may be retracted into a compact case or housing for portability.

Slide rules or similar instruments employing the process of graphical addition are generally rigid in construction and of adequate size to provide a reasonable degree of accuracy in making computations. In order to render such slide rules portable, miniaturization has been resorted to but at the sacrifice of accuracy in the making of computations.

In order to satisfy the requirements of smallness of size and accuracy in use, portable instruments have been proposed having scale members of conventional, large size which were retractably coiled into a housing small enough to provide the necessary portability. Such instruments have not become popular for many different reasons, among which were the difficulty of manipulation, relatively complicated construction, and corresponding expense.

The present invention constitutes a decided improvement in the art of such retractable instruments wherein the problems of manipulation inherent in the prior art devices have been overcome while at the same time a decided simplification in construction as well as reduction in cost have been achieved.

It is therefore an object of this invention to provide a slide rule having standard size scales which may be stored conventiently in a compact housing or the like for portability.

It is another object of this invention to provide a portable slide rule of the character mentioned in the preceding which is capable of being handled and manipulated with the same ease as a rigid, conventional slide rule.

It is still another object of this invention to provide a portable slide rule wherein flexible tapes are used as the scale members, and which, when extended, become rigid but which may be coiled spirally into a relatively small space for portability. As a corollary of this object, there is provided a portable instrument which, when extended for making slide rule calculations, may be manipulated in the same simple manner as any conventional slide rule.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view of one embodiment of this invention with the scale members at least partially extended for operation;

FIG. 2 is a similar view with the scale members fully retracted into the housing;

FIG. 3 is a top plan view thereof with the scales extended for making slide rule calculations;

FIG. 4 is a front view of the housing only showing the configuration of the slot through which the scale members may be operated;

FIG. 5 is a cross-section taken substantially along section line 5—5 of FIG. 1;

FIG. 6 is a view of the interior of the mechanism in side elevation with one-half of the housing being removed, this view showing the scale members extended for operation as a slide rule;

FIG. 7 is a view similar to FIG. 6 but with the scale members retracted into the housing;

FIG. 8 is a view of the drum within and about which the scale members are coiled and uncoiled;

FIG. 9 is a sectional view taken substantially along section line 9—9 of FIG. 3;

FIG. 10 is another sectional view taken substantially along section line 10—10 of FIG. 3;

FIG. 11 is a fragmentary view of the coiled end of one of the scale members in stretched out condition for the purpose of showing the tapered, end shape thereof; and FIG. 12 is a perspective view of another embodiment with the side removed for viewing the interior.

Referring to the drawings, a case or housing 20 is substantially of the shape shown in the drawings and made in two halves 22 and 24 as shown more clearly in FIG. 5. These halves are identically made with the exception, again as shown in FIG. 5, that half 24 is provided with a central opening 26 while the half 22 has no such opening. These casing halves are preferably formed of plastic such as nylon and are secured together by means of screws or pins which fit into apertures 28 located at the corners as shown more clearly in FIGS. 6 and 7. Projecting inwardly from the side 30 of the housing is an annular shoulder 32 which defines a bearing socket 34. Journaled within this bearing socket 34 is the hub 36 on the side 38 of a drum or drum device, generally indicated by the numeral 40. This drum 40 is shown alone in FIG. 8.

Referring again to FIG. 5, this drum 40 further includes a cylindrically shaped rim 42 secured at one end portion thereof to the disc-shaped side 38. Projecting coaxially inwardly from the hub 36 is a cylindrically shaped post 44. The rim 42 and the post 44 are made to such size as to provide an annular storage space 46 therebetween.

Preferably, this drum 40 is molded of the same plastic, such as nylon, as the housing 20. The sizes of the cavity 34 and hub 36 are so arranged as to make the drum 40 freely rotatable within the housing about the axis of the post 44 and the rim 42.

Fitted within the opening 26 of the housing section 24 is a part which may be characterized as a disc brake composed of an annular disc-like backing 48 having a centrally outwardly projecting boss 50 slidably received by the aperture 26. Both the backing disc 48 and the boss 50 are provided with a coaxial, cylindrically shaped cavity 52 which slidably fits over the end of the post 44 as shown. An annular shoulder 54 projecting inwardly from the side 56 of the housing is engageable with the backing disc 48 as shown to retain the disc brake in assembly.

On the inner face of the backing disc 48 is provided a layer or lining 58 of some suitable friction material which is soft and pliable. Preferably, a soft vinyl plastic or leather-like material is used. Similarly, a lining 60 is provided on the facing surface of the drum side 38.

The scale members used in this invention preferably are made of thin steel tapes of the type conventionally employed in retractable measuring tapes. These tapes are transversely bowed to render them substantially rigid when extended, but, otherwise, are flexible so as to be spirally coilable within a housing for portability. As will appear obvious, this invention is not limited to the use of steel tapes as scale members, for example such scale members may be fabricated of plastic or the like materials so long as they retain the properties of being sufficiently rigid during extension while slide rule manipulations are being conducted and otherwise flexible enough for spiral coiling when the device is not being used.

In keeping with conventional slide rule designs, this invention employs two scale members 62 and 64 which are transversely bowed steel tapes. The scale 62, as more clearly shown in FIG. 3, is wider than the scale 64, the latter being superposed upon and centered with respect to the scale 62.

The front side 66 of the housing is provided with a transverse slot 68 having a length only slightly longer than the width of the scale 62. The width of this slot 68 is large enough to accommodate the superposed scales 62 and 64 and additionally to accept the cursor 70 which is slidable on the scales 62 and 64. The scales as well as the cursor 70 may, therefore, be inserted through the slot 68 and into the housing 20 for storage, as will be explained in more detail later on.

The relative size and positional relationship between the drum device 40 and the housing 20 is more clearly shown in FIGS. 5, 6 and 7. As shown more clearly in FIGS. 1 and 6, the scale 62 projects through the slot 68 into the interior of the housing 20, where it is attached to the outer periphery of the rim 42 by means of a screw or the like 72. As is more clearly shown in FIG. 8, the width of the scale member 62 is made to coincide substantially with the length of the rim 42. By moving the scale member 62 longitudinally toward the right, as viewed in FIG. 6, the drum device 40 will be rotated counterclockwise and the scale 62 will spirally wrap or coil therearound until the scale is fully retracted within the housing.

A second slot 74 is provided in the rim 42 of the drum 40 as shown more clearly in FIG. 8 so as to receive in guiding relation therethrough the scale 64. This slot 74 extends parallel to the axis of the drum and is centered between the opposite ends of the rim 42. Further than this, the slot 74 is centered with respect to the scale 62 so as to position the scale 64 midway between the opposite edges of the scale 62.

Referring to FIG. 6, the scale 64 has one end portion spirally coiled within the annular storage space 46 in the drum 40 with the end thereof being secured to the post 44 by means of a screw 76. The number of turns in the spiral just described will become obvious from the descriptoin that later follows.

If both the scales 62 and 64 are concurrently moved rightwardly as viewed in FIG. 6, the drum 40 will be rotated counterclockwise whereupon both scales, in superposed relation, will be spirally wrapped around the rim 42. This is shown in FIG. 7.

If the scale 62 is held stationary, and the spiraling within the drum 40 properly arranged, the scale 64 can be moved rightwardly as viewed in FIG. 6 through the slots 68 and 74 and into the storage space 46. By assuring that there are the proper number of coils within the drum device 40, it is obvious that the scale 64 may be extracted therefrom and retracted thereinto with facile, continuous motions.

For one successful slide rule construction, the calculating portion of the scale 64 is made twice as long as the calculating portion of the scale 62. This being true, the number of coils employed within the drum 40 must be such as to permit the full extension and retraction of the scale 64 so as to insure that the full double calculating length of the scale 64 is available for use in conjunction with the calculating length of the scale 62.

As noted in FIG. 6, the slot 74 is positioned immediately adjacent to the point of attachment of the scale 62 to the drum 40. This insures relative, manipulative movement of the scale 64 with respect to the scale 62 when both are extended to the position shown in FIG. 6.

The relative widths of the tapes with respect to the dimensions of the housing 20 and the drum device 40 are as shown in FIG. 5. In one embodiment, the part of the scale 64 which normally remains coiled inside the drum device 40 is tapered as shown in FIG. 11. The tapered end portion indicated by the numeral 78 is preformed into a resilient spiral shape such that when it is fitted into the drum device 40, it will exert a spring force on the tape 64, tending to retract the latter from a fully extended position. The reason for this will be explained in more detail later on. The tapered configuration of the spring end 78 provides a uniform opposing spring force as the tape 64 is drawn from the fully retracted position to a fully extended position. Thus, no more force will be exerted on the scale 64 tending to retract the same in the fully extended position than in the partially extended position. If the scale end 78 were of uniform width, an increasing pulling force would be experienced the farther out the scale 64 is drawn.

On the outer end of the scale 62 is provided a guide assembly shown in more detail in FIG. 9. This assembly includes two bar-like elements 80 and 82 which are suitably secured together and to scale 62 by rivets or screws 84. A notch or slot 86 is provided in the upper part 82 for slidably receiving the scale 64. This slot 86 is centered between the opposite edges of the scale 62 so as to retain the scale 64 properly centered. Thus, the scale 64 may be moved longitudinally with respect to the scale 62 and remain in centered position, the guide assembly 80, 82 securing the distal end in position while the slot 74 in the drum 40 locates the opposite end portion.

An end piece 88 of plastic or the like is secured to the distal end of the scale 64 by means of a screw 90. This piece 88 is made large enough so it cannot be drawn through the slot 86 in the guide assembly 80, 82.

The cursor 70 previously mentioned is shown more clearly in FIG. 10 as being composed of a self-supporting piece of transparent plastic folded over the opposite edges of scale 62 as shown. This cursor 70 is provided with the usual hairline. The folded-over portions of the cursor 70 form channels indicated by the numeral 89 having bottoms which are spaced apart a distance substantially coinciding with the opposite edges of the scale 62. Actually, it is desired that these bottoms frictionally engage the scale edges so as not only to provide resistance against accidental movement of the cursor 70, but also to exert a slight bowing force on the scale 62 which in turn provides for alignment of the cursor to the scale 62 and to scale 64.

It is desired that the plate of the cursor clear slightly the scale 64 as shown more clearly in FIG. 10.

When the scales 62 and 64 are fully retracted into the housing 20 as illustrated in FIG. 7, the scale 62 will be spirally coiled about the rim 42 as shown, and the scale 64 will be spirally coiled both within and about the rim 42 as shown. The cursor 70 will be retracted through the slot 68 into the housing 20. The guide assembly 80, 82 abuts the front side 66 of the housing, thereby preventing the scales from retracting further into the case.

Withdrawal of the scales 62 and 64 is simply accomplished by grasping the guide assembly 80, 82 in the fingers and pulling outwardly thereon. Both scales 62 and 64 will be drawn outwardly until the scale 62 is fully extended to the position shown in FIGS. 1 and 6. Because of the bowed condition, the scales 62 and 64 will assume a rigid, straight shape. By holding the housing 20 in one hand, it is now possible to operate the slide rule with the other hand which is used not only to manipulate the cursor 70 but also to slide the scale 64 with respect to the scale 62. With the scale 62 fully extended, it is possible to draw the scale 64 outwardly further by merely exerting a pulling force thereon. That portion of the scale 64 stored within the drum 40 will merely unwind and pass outwardly through the slots 74 and 68. To and fro sliding movement of the scale 64 with respect to the scale 62 is thus possible, such movement being accommodated by more or less of the scale entering and being withdrawn from, respectively, the drum 40.

While calculations are being made, it is necessary to move the scale 64 relative to the scale 62 to a precise position. It is then necessary to move the cursor 70 with respect to the two scales to a particular point for the purpose of either completing or continuing the calculating operation. In order to insure that there is no relative movement of the scale 64 with respect to the drum 40 and in turn the scale 62 when it has been adjusted into position, the thumb or forefinger of the hand holding the case 20 is engaged with the boss 50 for the purpose of pressing the friction lining 58 against the coils of the scale 64 which are inside the drum 40. Further retraction of the scale 64 with respect to the drum 40 is thereby prevented. While the brake is thereby being held, the cursor 70 may be moved to and fro on the two scales 62 and 64 without disturbing the relative setting therebetween. If it is desired to move the scale 64 with respect to the scale 62, it is only necessary to release the boss or button 50, in which event the scale 64 can be moved into or out of, as the case might be, the chamber 46.

With reference to the force exerted by the coiled portion 78 of the scale 64 which is inside the drum 40, it is important that when the two scales 62 and 64 are extended for calculation that this spring portion not exert excessive force whereby the scale member 62 could be buckled. This buckling might result from the engagement of the end piece 88 against the guide assembly 80, 82. On the other hand, it is desirable that this spring portion exert enough pulling or retracting force on the scale 64 such that when it is desired to retract the scale members within the case 20, and the scale 62 is moved initially in retracting direction, the scale 64 should instantaneously move therewith. Thus, with the cap 88 on the end of the scale 64 abutted against the guide assembly 80, 82 and the tape 62 then moved in a retracting direction, the scale 64 will instantaneously retract therewith to the position shown in FIG. 2. If the spring were not strong enough initially to provide some slight retracting or pulling tension on the scale 64, it would be possible for the scale 64 to project slightly outwardly and away from the guide assembly 80, 82 such that it would never retract completely inside the housing 20. The reason for this is the scale 64 will tend to be forced outwardly due to the difference in diameters of the superposed scales as they are being coiled within the housing 20.

Inasmuch as the coiled end of the scale 64 is tapered as shown in FIG. 11, when the brake 48, 50 is operated, the outermost coils which are the widest will always be frictionally engaged first. This is important, because it prevents movement of the scale 64, even to the slightest extent, after the brake is applied. Obviously, in the making of calculations, no movement can be tolerated of either of the scale members when a setting has been made. Thus, when a setting has been made and the brake is applied, the scale member 64 will be held positively in place while readings are taken or the cursor 70 is operated, as the case may be.

An alternative construction is shown in FIG. 12 which is intended to be identical to that just described with the exception that no post 44 is provided on drum 40. Instead, a stationary supporting axle 44a secured to or integral with casing 20 is identically positioned about which the drum is rotated. The tape 64 has its end fastened to this stationary post 44a, the construction and operation of the device being the same as just described.

Inasmuch as the scale 62 exerts normally a self-straightening force, when it is fully extracted from the case 20 to the position shown in FIGS. 1 and 6, it will tend to hold this position without any locking or holding means being provided. Another method of preventing relative movement of the scale 64 with respect to the scale 62 resides in slightly retracting both scales 62 and 64 simultaneously until the drum 40 has been rotated just enough so that slot 74 will bind the tape 64 to the drum 40. In some instances, it may be preferred to hold the two tapes against relative movement by this means.

While there have been described above the principles of this invention in connection with specific apparatus, it is to be clearly understood that this description is made only by way of example and not as a limitation to the scope of the invention.

What is claimed is:

1. A retractable slide rule comprising two elongated coilable scale members, means for supporting said scale members for movement in juxtaposed parallel relation, one scale member being longer than and movable with respect to the other, said supporting means including means mounting said scale members for movement between two extreme positions, one position being for storage wherein said scale members are in coiled condition, the other position being for slide rule operation in which said scale members are extended from said coiled condition into straight parallel relationship, and means for exerting a force on said one scale member while in said other position tending to move it toward said storage position independently of and with respect to the other scale member, whereby both scale members may be moved together from said extended position to said storage position.

2. The slide rule of claim 1 including means selectively operable for arresting movement of said one scale member by said force-exerting means.

3. The slide rule of claim 1 wherein said scale members are superposed when in extended position.

4. The slide rule of claim 1 wherein said scale members are superposed when in extended position, said one scale member being narrower than the other scale member and being disposed between the opposite edges thereof, said other scale member being transversely bowed and formed of resilient material, and a cursor carried by said scale members and having portions frictionally engaging the opposite edges of said other scale member.

5. A retractable slide rule comprising two elongated coilable scale members disposed in juxtaposition for movement relative to each other, means for supporting said scale members including means for coiling one scale member inside the other, said coiling means including a rotatable drum device to which said other scale member is attached and about which said other scale member is coilable, one end portion of said one scale member being operatively disposed and coilable within said drum device, and the remaining end portion of said one scale member being superposed on the other scale member and coilable with the latter about said drum device, whereby said one scale member may be alternatively moved independently of or together with said other scale member.

6. The slide rule of claim 5 including means for selectively retarding movement of said one scale member against coiling within said drum device.

7. The slide rule of claim 5 wherein said scale members are movable between two positions, one position being for storage in which said scale members are in spirally coiled condition without and about said drum device, the second position being for slide rule operation in which said scale members are at least partially uncoiled from said drum device and extended in straight parallel relationship, and means yieldably urging said one scale member in a direction from said second position toward said one position.

8. The slide rule of claim 7 wherein the last-mentioned means is a spirally coiled spring.

9. The slide rule of claim 5 wherein said scale members are transversely bowed tap-like elements formed of resilient material, said one scale member being narrower than the other and disposed between the edges thereof, said supporting means including a housing having a slot which receives said superposed scale members for movement therethrough, said slot having guiding engagement with said scale members, said drum device being mounted within said housing for rotation about an axis substantially parallel to the length dimension of said slot, said scale members being movable between two positions, one position being for storage within said housing in which said scale members are in spirally coiled condition within and about said drum device, the second position being for slide rule operation in which said scale members are coiled from about said drum device and extended through said slot outwardly from said housing in straight parallel relationship, and means for retaining said scale members in superposed slidable relation while in said second position.

10. The slide rule of claim 9 wherein said drum device has a cylindrical portion, said other scale member being attached at one end to said cylindrical portion, said cylindrical portion having an axially extending slot through which said one scale member movably projects, said one end portion of said one scale member being spirally coilable within said cylindrical portion and said remaining end portion of said one scale member being spirally coilable with said other scale member about said cylindrical portion, said one scale member having an end disposed within said cylindrical portion, and means for securing the last-mentioned end against withdrawal from said cylindrical portion.

11. The slide rule of claim 10 wherein the last-mentioned means is a part affixed to and rotatable with said cylindrical portion, said last-mentioned end being operatively attached to said rotatable part.

12. The slide rule of claim 11 wherein a spirally coiled spring has one end connected to said rotatable part and the other end connected to said last-mentioned end, said spring exerting a force tending to move said one scale member into said cylindrical portion.

13. The slide rule of claim 12 in which said spring is of flat stock tapered in width from one end to the other, the narrower end of said spring being connected to said rotatable part and the wider end being connected to said last-mentioned end, said spring having a plurality of coils, the degree of taper in said spring being such as to exert a substantially constant force on said one scale member as it is withdrawn from said housing to the extended slide rule position.

14. The slide rule of claim 12 wherein said spring exerts a force on said one scale member insufficient to buckle said other scale member.

15. The slide rule of claim 10 wherein the slot in said cylindrical portion positions said one scale member between the opposite edges of said other scale member, and said retaining means of claim 9 including a device on the distal end of said other scale member having a slot therethrough which slidably receives said one scale member, the last-mentioned slot locating said one scale member between the opposite edges of said other scale member.

16. The slide rule of claim 5 wherein said scale members are transversely bower resilient tape-like elements, said one scale member being narrower than the other and disposed between the edges thereof; said supporting means including a housing within which said drum device is mounted for rotation, said drum device including a cylindrically shape rim having opposite ends, a hub on one end portion of said rim which carries a post coaxially positioned within said rim, said post being radially spaced from said rim thereby providing an annular storage space, said housing having an internal wall which surrounds said rim in spaced relation, said housing having a first slot in said wall, said slot having a length dimension substantially parallel to the axis of rotation of said drum device, said rim having a second slot therein which extends substantially parallel to said axis, said superposed scale members being slidably received by said first slot, one end of said other scale member being attached to said rim adjacent to said second slot, said one scale member being slidably received by said second slot, said second slot being axially centered with respect to the ends of said rim and also said first solt, said second slot having a length corresponding to the width of said one scale member for centering the latter with respect to said other scale member, said one end portion of said one scale member being spirally coiled about said post within said storage space when said one scale member is at least partially retracted, the end of said one end portion having a connection with said post, a portion of said one scale member being outside said rim and coiled thereabout when retracted within said housing, both said scale members having distal ends projecting outside said housing, a keeper on the distal end of said other scale member which centers said one scale member on said other scale member, said keeper slidably receiving in guiding relation said one scale member.

17. The slide rule of claim 16 including means for selectively retarding movement of said one scale member against coiling within said drum device.

References Cited
UNITED STATES PATENTS

| | | | |
|---|---|---|---|
| 937,863 | 10/1909 | Roberts | 235—70 |
| 2,546,243 | 3/1951 | Tarshis | 235—71 |
| 2,615,630 | 10/1952 | Eckel | 235—71 |

STEPHEN J. TOMSKY, *Primary Examiner.*